United States Patent
Litchfield

[15] 3,647,257
[45] Mar. 7, 1972

[54] VEHICLE BODIES
[72] Inventor: Edward Francis Litchfield, Coventry, England
[73] Assignee: Rootes Motors Limited, London, England
[22] Filed: May 25, 1970
[21] Appl. No.: 40,337

[30] Foreign Application Priority Data
June 3, 1970 Great Britain .......................27,987/69

[52] U.S. Cl..............................................296/91, 296/146
[51] Int. Cl. .........................................................B60j 1/20
[58] Field of Search............................................296/91, 146

[56] References Cited
UNITED STATES PATENTS
3,097,882  7/1963  Andrews..................................296/91
3,010,754  11/1961  Shumaker..............................296/91 X Primary Examiner—Philip Goodman
Attorney—Mawhinney & Mawhinney

[57] ABSTRACT

A vehicle body has a rear access door in which a rear window is formed. An air vane is mounted on the body and door above the rear window to direct airflow over the window during forward movement of the vehicle.

8 Claims, 4 Drawing Figures

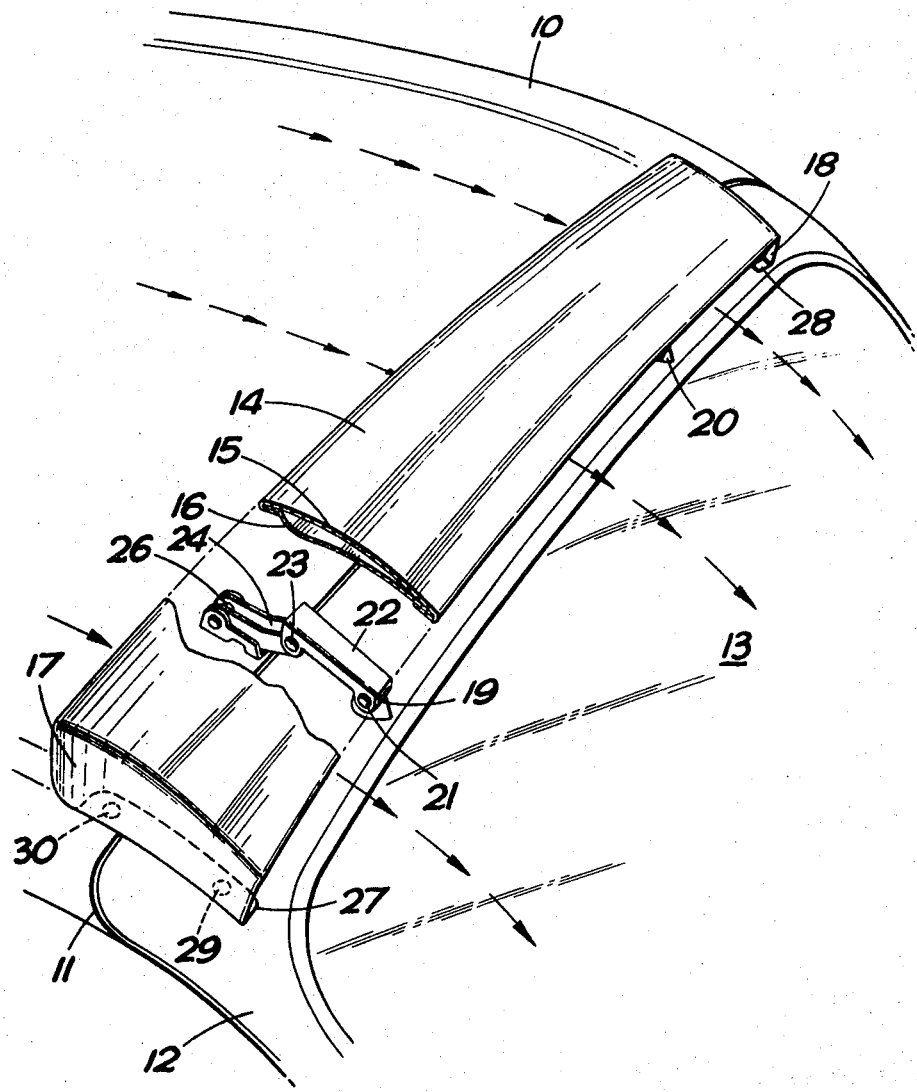

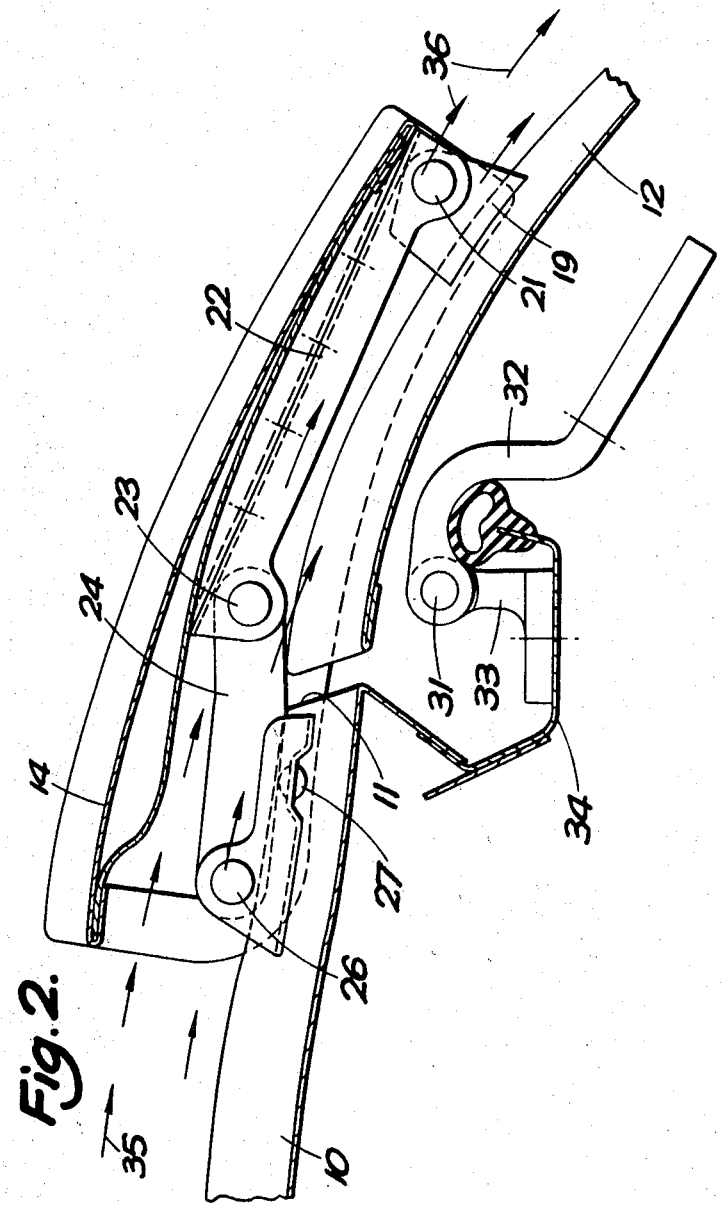

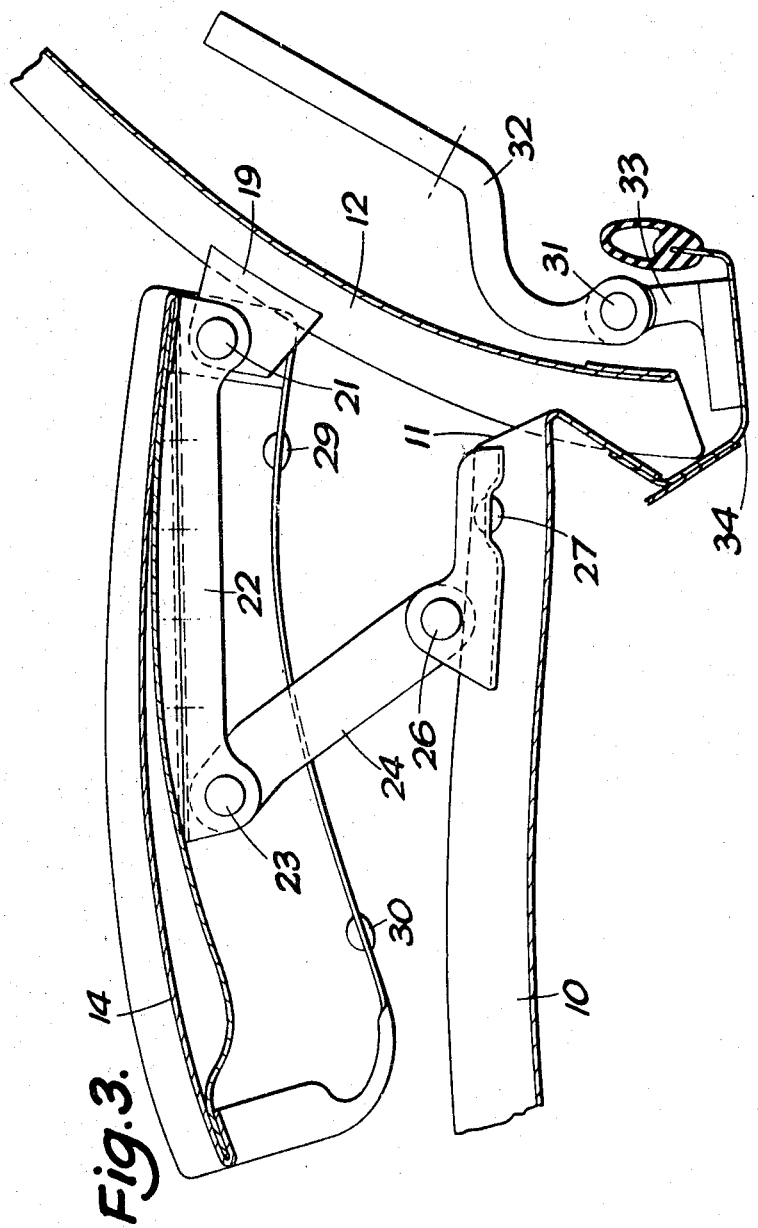

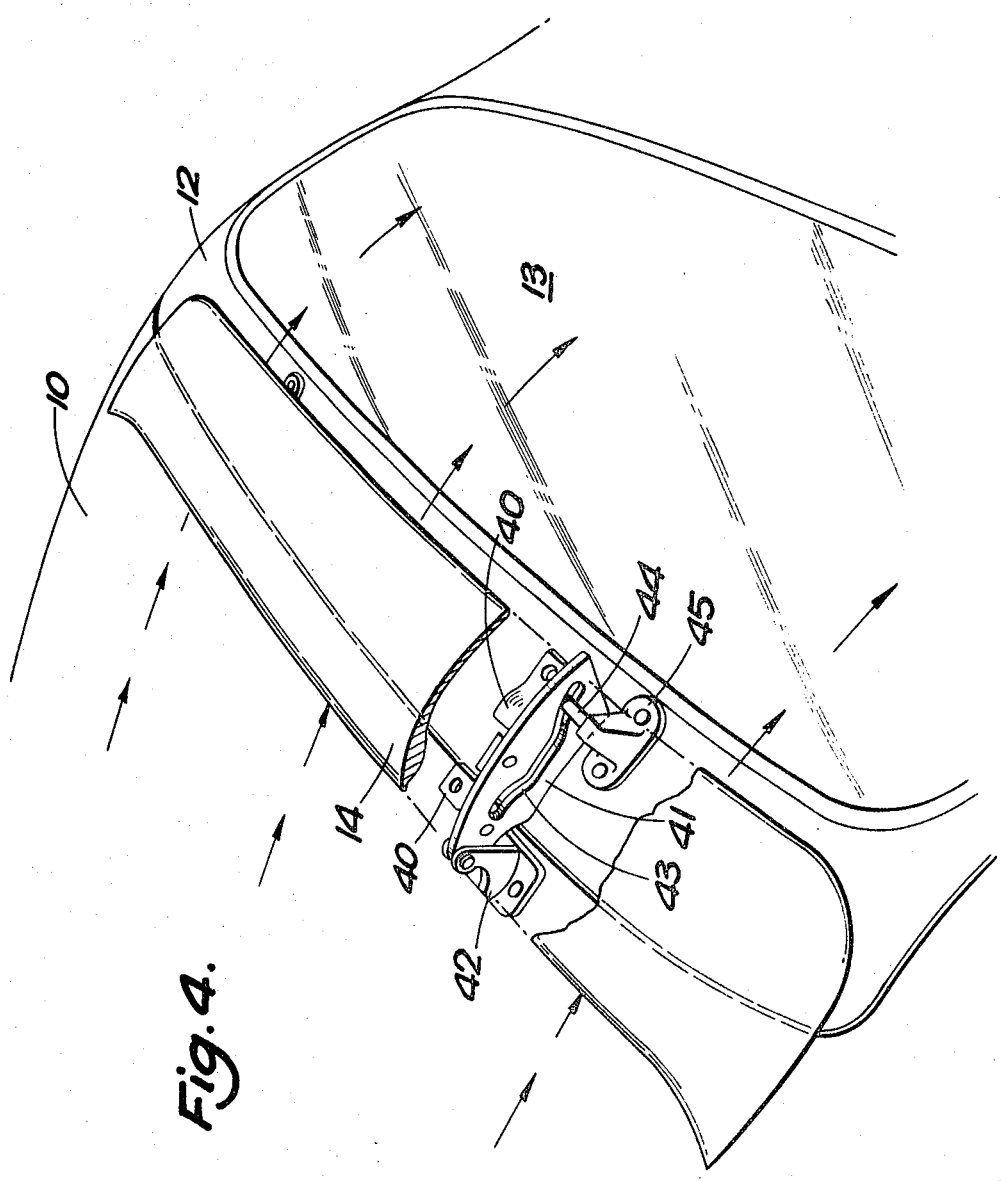

VEHICLE BODIES

This invention relates to vehicle bodies.

The invention provides a vehicle body having a rearwardly facing window, a vane mounted on a part of the vehicle body adjacent the upper edge of the window, which vane is constructed and arranged to direct air onto the window during forward movement of the vehicle.

The vane may be upwardly convex in cross section transverse to the fore and aft direction of the vehicle.

The body may have a rear access opening which is closed by a door in which a window is formed and the vane is mounted on the door and/or a part of the vehicle adjacent the door.

The door may be pivoted about an axis at its upper end which extends across the vehicle and the vane is pivotally mounted on the door towards the rearward end of the vane and, towards the forward end of the vane, is pivotally connected by a linkage to the vehicle body adjacent the upper edge of the door so that opening of the door moves the vane upwardly and forwardly over the vehicle roof.

Alternatively the door may pivot about an axis at its upper end which extends across the vehicle and the vane may be pivotally mounted at its forward end on the roof and has a guideway in which a guide on the door engages to support the rearward end of the vane and to raise the vane when the door is raised.

The vane may have a aerofoil cross section.

The vane may comprise two sheets secured together at their edges one of which sheets provides the upper surface of the aerofoil and the other of which sheets provides the lower surface of the aerofoil.

Alternatively the vane may be a plastics moulding.

The following is a description of a specific embodiment of the invention reference being made to the accompanying drawings in which:

FIG. 1 is a diagrammatic perspective view of a rear part of an estate car body having an air deflector vane;

FIG. 2 shows a sectional view of the rear part of the body and vane with the tailgate closed;

FIG. 3 is a similar view to FIG. 2 with the tailgate open; and,

FIG. 4 is a similar view to FIG. 1 showing an alternative construction of deflector vane.

Referring firstly to FIG. 1 of the drawings there is shown a rearward part of an estate car body having a roof 10 and rear access opening 11 which is closed by a tailgate 12. The tailgate 12 is provided with a rear window 13.

Overlying the part of the tailgate 12 above the window 13 and an adjacent part of the roof 10 is an aerofoil section vane 14 which extends across the vehicle for substantially the whole width of the window 13. The vane is made up from two oppositely curved panels 15 and 16 which are joined together along their longitudinal edges. Opposite ends of the vane are closed by the sidewalls 17 and 18.

Two laterally spaced mountings 19 and 20 are located on the tailgate 12 immediately above the window 13. The mountings are carried by pivot pins 21 on to brackets 22 which are secured to the lower panel 16 of the vane by bolts (not shown). The brackets 22 extend forwardly along the underside of the vane and are pivotably connected at their forward ends by pins 23 to links 24 which in turn are pivotally connected by pins 25 to brackets 26 mounted at spaced locations on the vehicle roof 10 immediately above the access opening 11 for the tailgate.

The end plates 17 and 18 are formed along their lower edges with inwardly extending flanges 27, 28 respectively. The flanges are each provided with two spaced rubber stops 29, 30 for engaging the upper surface of the tailgate and the roof when the tailgate is in the closed position.

Referring now to FIG. 2 of the drawings the tailgate 12 is mounted on the vehicle roof 10 by means of a hinge 31 one member 32 of which is secured to the underside of the tailgate by means (not shown) and the other member 33 of which is secured by means (not shown) to the bottom wall of a drain channel 34 extending along the upper edge of the opening 11.

When the tailgate is in the closed position, as shown in FIG. 2, airflow due to forward movement of the vehicle enters the space between the vane 14 and the adjacent upper part of the roof 10 along the direction of the arrow 35 and is deflected by the underside of the vane along the direction of the arrow 36 onto the surface of the rear window 13. The airflow thus produced assists in keeping the window 13 free of moisture and dirt.

When the tailgate is opened as shown in FIG. 3 the links 24 swing upwardly and forwardly to raise the vane and to move it forwardly over the roof of the vehicle 10.

Referring now to FIG. 4 of the drawings there is shown an alternative construction in which the vane 14 is a rigid plastics moulding. Part way from both ends of the vane two fore and aft spaced brackets 40 are secured to the underside of the vane and a flange 41 extending for and aft across the underside of the vane is secured to the brackets. The flange is pivotally mounted at its forward end or a bracket 42 secured to the rearward end of the roof.

The flange has a longitudinally extending slot 43 in which a post 44 on a bracket 45 engages. The bracket 45 is mounted on the tailgate 12 above the rear window 13.

When the tailgate is raised the vane 14 is also raised about its pivotal mountings on the brackets 40 and the posts 44 slide along the slots 43.

I claim:

1. A vehicle body having a rear access opening, a door for closing the opening, means to pivot the door about an axis extending across the vehicle body at an upper end of the opening, a window in said door adjacent the upper end of the door, a vane extending across the vehicle over the upper end of the opening for directing air over the window during forward movement of the vehicle body, and means to mount the vane for pivotal movement on both the vehicle body adjacent the upper end of the opening and on the upper end of the door, said mounting means permitting translational movement of the vane with respect to either the vehicle body or the vehicle door as the door is pivoted about said axis.

2. A vehicle body as claimed in claim 1 wherein the mounting means comprise at least on trailing link and means to pivotally connect a rearward end of the link to the vane and a forward end of the link to the vehicle body adjacent the upper end of the opening and means to pivotally connect the vane to the door.

3. A vehicle body as claimed in claim 2 wherein two such links are pivotally connected to the vane and the body at spaced locations across the vehicle body.

4. A vehicle body as claimed in claim 1 wherein the mounting means comprise means to mount the vane for pivotal movement on the vehicle body adjacent the upper end of the opening, at least one guideway mounted on an underside of the vane and extending in a fore and aft direction with respect to the vehicle body and a guide mounted on the upper end of the door slidable along and rotatable in the guideway.

5. A vehicle body as claimed in claim 4 wherein two such guideways are provided on the underside of the vane at locations spaced across the vehicle body and two such guides are mounted on the upper end of the door and engage in the two guideways respectively.

6. A vehicle body as claimed in claim 1 wherein the vane has an aerofoil cross section.

7. A vehicle body as claimed in claim 6 wherein the vane comprises two sheets secured together at their edges, one of which sheets provides an upper surface of the aerofoil and the other of which sheets provides a lower surface of the aerofoil.

8. A vehicle body as claimed in claim 1 wherein the vane is a plastics moulding.

* * * * *